United States Patent Office 3,415,642
Patented Dec. 10, 1968

3,415,642
ADDITIVE FOR PRODUCTION OF SPHEROIDAL GRAPHITE CAST IRON CONSISTING MOSTLY OF CALCIUM-SILICON
Hiroshi Matsumoto, Yono, Japan, assignor to Tokyo Kakin Kogyo Co., Ltd., Tokyo, Japan
No Drawing. Filed Apr. 4, 1966, Ser. No. 539,624
Claims priority, application Japan, Dec. 13, 1965, 40/76,207
2 Claims. (Cl. 75—130)

This invention relates to an additive for production of cast iron containing spheroidal graphite, more particularly an additive consisting mostly of calcium-silicon for production of cast iron containing spheroidal graphite on a large scale at a low cost, which is prepared by coating said calcium-silicon with a solution of subcomponent comprising calcium chloride or a mixture of calcium chloride and a chloride or rare earth element, said solution further containing at least one of auxiliary compound selected from the group consisting of magnesium chloride, barium chloride, oxides of rare earth elements, fluorides of rare earth elements, carbonates of rare earth elements, magnesium fluoride, barium carbonate, and the like, and then by dehydrating thus coated calcium-silicon. Cast iron containing spheroidal graphite can be produced easily at a high yield by adding said additive to the surface of molten pig iron or by penetrating it under pressure into a molten bath.

The reasons for adding such compounds as mentioned above to calcium-silicon are as follows:

(1) Calcium chloride, chlorides of rare earth elements, magnesium chloride, and barium chloride are all soluble in water to produce an aqueous solution thereof, of which an aqueous solution of calcium chloride and/or chlorides of rare earth elements is not crystallized even when heated to evaporate the moisture thereof but become a highly viscous solution, and such a viscous solution is solidified upon cooling. It is possible to disperse magnesium chloride and barium chloride in the viscous solution. If powder particles of calcium-silicon are added to such a highly viscous solution containing magnesium chloride and/or barium chloride and the solution is stirred while heating for dehydration, the calcium chloride and/or chlorides of rare earth elements in the solution is solidified to form shells containing magnesium chloride and/or barium chloride to coat the surface of each powder particle of calcium-silicon.

(2) Any of said four kinds of compounds can be obtained easily at a low cost.

(3) Calcium chloride has a low melting point (773° C.) while having a comparatively high boiling point (over 1,600° C.), and hence liquid state calcium chloride has a high fluidity and acts to reduce the melting point of other metal oxides and increase the fluidity of such metal oxides. If such calcium chloride is added to the molten bath of pig iron, it acts to reduce the melting points of metal oxides, metal sulfides, and other impurities therein, and improves the fluidities thereof, thereby the removal of impurities comprising such oxides and sulfides can be made considerably easier, and resulted in a clean bath substantially free from the dross of iron.

On the other hand, calcium chloride contained in the coating layer tightly adhered to the outer surface of each calcium-silicon particle acts to prevent the chemical reaction of the calcium with oxygen or carbon on the surface of or inside of the molten bath when the additive is added thereto, and accordingly wasteful consumption of calcium is prevented and the quantity of calcium-silicon additives necessary for the production of spheroidal graphite can be minimized.

(4) Chlorides of rare earth elements, magnesium chloride and barium chloride cause following chemical reactions upon adding them to a molten bath together with the calcium-silicon additive.

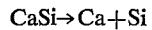
$$CaSi \rightarrow Ca + Si$$
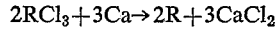
$$2RCl_3 + 3Ca \rightarrow 2R + 3CaCl_2$$
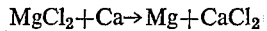
$$MgCl_2 + Ca \rightarrow Mg + CaCl_2$$
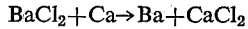
$$BaCl_2 + Ca \rightarrow Ba + CaCl_2$$

The $CaCl_2$ thus produced acts in the molten bath as described in the preceding paragraph 3, and R (rare earth element) thus isolated acts to facilitate the production of spheroidal graphite in the molten bath, while Ba element thus isolated acts to make the size of spheroidal graphite particles uniform and to facilitate the production of ferrite.

(5) Finely powdered water insoluble auxiliary agents, such as oxides carbonates and fluorides of rare earth elements, magnesium fluoride, barium carbonate, etc., are dispersed and suspended uniformly in the liquid state calcium chloride to adhere and coat the outer surface of each calcium-silicon particle. Accordingly, there is no danger of segregation, which sometimes happens in the case of alloys, and hence uniform composition can be always obtained easily.

(6) Auxiliary agents contained in the calcium chloride coating of each calcium-silicon particle, such as oxides, carbonates and fluorides of rare earth elements, magnesium fluoride, and barium carbonate, cause following chemical reactions upon adding them to a molten bath together with the calcium-silicon additive.

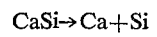
$$CaSi \rightarrow Ca + Si$$
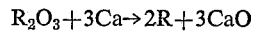
$$R_2O_3 + 3Ca \rightarrow 2R + 3CaO$$
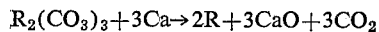
$$R_2(CO_3)_3 + 3Ca \rightarrow 2R + 3CaO + 3CO_2$$
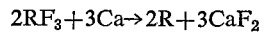
$$2RF_3 + 3Ca \rightarrow 2R + 3CaF_2$$
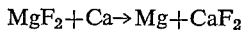
$$MgF_2 + Ca \rightarrow Mg + CaF_2$$
$$BaCO_3 + Ca \rightarrow Ba + CaO + CO_2$$

The CaO and $CaF_2$ thus produced are removed from the molten bath due to the fact that calcium chloride in the molten bath acts to reduce the melting point thereof and at the same time increase the fluidity thereof. The rare earth element R and Mg element act as simple substances respectively to facilitate the production of spheroidal graphite while Ba acts to make the size of spheroidal graphite particles uniform and to facilitate the production of ferrite.

(7) The dehydration process of calcium chloride can be carried out with comparative ease by heating. Magnesium chloride and chlorides of rare earth elements, which are normally difficult to dehydrate, can be easily dehydrated by using ammonium chloride.

By the reason set forth as above essential coating materials of calcium-silicon of the invention are selected to be calcium chloride and chlorides of rare earth elements.

The composition of the additives of the invention consists of 20 to 96% by weight of Ca—Si, 2 to 60% by weight of $CaCl_2$ or mixture of $CaCl_2$ and $RCl_3$, and 2 to 40% of at least one compound selected from the group consisting of $MgCl_2$, $BaCl_2$, $BaCO_3$, $R_2O_3$, $R_2(CO_3)_3$, $RF_3$ and $MgF_2$.

If the contact of $CaCl_2$ or the mixture of $CaCl_2$ and $RCl_3$ is less than 2% or Ca—Si content is more than 96% in the additives of the invention, sufficient coating can not be attained. On the other hand, if the content of $CaCl_2$ or the mixture of $CaCl_2$ and $RCl_3$ is more than 60% or Ca—Si content is less than 20% in the additives of the invention a great quantity of slugs is produced due to excessive amount of the coating agent.

If the content of the auxiliary agent such as $MgCl_2$, $BaCl_2$, $MgF_2$, $R_2O_3$, $R_2(CO_3)_3$, $RF_3$ and $BaCO_3$ is less than 2%, the effects of the auxiliary agents can not be attained. On the other hand, if the content of said auxiliary agents is more than 40% in the additives of the invention when the additive contains the lowest content of Ca—Si 20%, then it becomes impossible to reduce chemically the entire quantity of the auxiliary agents thus added and hence they are partially wasted.

Thus, the composition of the additives of the invention was determined as described above.

If the aforementioned additive of the invention is added to a molten bath of hyper-eutectic cast iron (containing 2.5 to 4.5% of C and 1 to 4.5% of Si) or hypo-eutectic cast iron (containing 2.5 to 1.3% of C and 1 to 4.5% of Si), then cast iron containing spheroidal graphite, which has a chemical composition of less than 0.02% of cerium, not less than 0.006% of calcium, and less than 0.02% of magnesium, can be obtained.

The salient features of the additive of the invention are as follows:

(a) The additive of the invention is very easily melted to the molten bath. Since the chemical reaction of such salts as $RCl_3$, $MgCl_3$, $MgF_2$, $BaCl_2$ in the additive of the invention with Ca are exothermic, there will be no temperature reduction of the molten bath due to addition of said additive. On the contrary, the temperature of the molten bath is sometimes increased by the addition of said additive. Furthermore the aforementioned exothermic reactions following the addition of the additive of the invention are very mild and there will be no danger of causing explosive reactions as those reactions following an addition of metallic magnesium.

(b) The composition of the additive of the invention can be made uniform according to the aforementioned process, and there is no danger of resulting from segregation, which is sometimes caused in the case of alloys. The auxiliary agents in the invention are tightly adhered to the outer surface of each Ca—Si particle, and hence they react quickly without any loss.

(c) The chance of producing cementite is greatly reduced by using the additive of the invention, and hence thin or small cast articles can be produced without any further treatment if cast iron is prepared with the additive of the invention. Cast iron articles of high mechanical strength can be obtained without any further treatment, since a large degree of graphitization is attained by using the additive of the invention. The composition of cast iron produced by using the additive of the invention is mostly of ferrite type, and provided with a high tensile strength. The tensile strength of said cast iron is 45 to 55 kg./mm.² without applying any further treatments and the corresponding elongation is 4 to 18%.

(d) The number of shrinkage defects in the cast article is also minimized, thereby the size of the riser can be made smaller compared with that of conventional cast iron. Thus, the iron casting design can be considerably simplified.

(e) Practically no dross is produced, and the slugs can be also easily removed after being processed.

(f) Responsive to the size, thickness, and use of the article to be cast, the ratio between the quantities of calcium-silicon and the auxiliary agents in the additive of the invention can be easily modified to meet the specific needs of each cast article.

The invention will now be described in further detail by taking examples.

Example 1

A mixture which consists of 10 kg. of hydrous chloride of rare earth elements, 5 kg. of calcium chloride, 5 kg. of hydrous magnesium chloride, and 1 kg. of barium chloride, was taken in a vessel and melted by heating the vessel. After the mixture melted completely, 2 kg. of ammonium chloride was added thereto, then the contents poured out on a drying pan made of iron plate. Thereafter, 40 kg. of pulverized calcium-silicon of under 3 mm. diameter was added, then the pan was heated by applying a flame directly thereto in order to dehydrate gradually and make adhere chlorides of rare earth elements, calcium chlorides and magnesium chloride on the outer surface of each calcium-silicon particle therein. When the contents of the pan was heated to 560° C., white smoke of ammonium chloride rose from the said contents. The drying and dehydrating treatment was carried out continuously until said white smoke was ceased, and then the pan with the contents in it was cooled in a sealed vessel and after cooled replaced the contents in a sealed container such as a polyethylene bag and stored to use as the additive of the invention.

On the other hand, 1 kg. of Kamaishi ductile pig iron having a composition shown in Table 1 was melted in a graphite crucible by using a Kryptol electric furnace, and then the above described additive of the invention was added to the surface of the molten bath. The molten bath was inoculated in the case of some test pieces by adding 0.5% of ferro-silicon as an inoculant, but not inoculated in the case of other test piece.

The molten bath was then molded into a plurality of test pieces consisting of rods of 20 mm. diameter by using green sand molds to carry out microscopic analysis on a fracture of each said test piece. The results of the chemical analysis of the Kamaishi ductile pig iron and said microscopic analysis are shown in Tables 1 and 2 respectively.

TABLE 1

| Elements | C | Si | Mn | P | S | Fe |
|---|---|---|---|---|---|---|
| Content (percent) | 3.96 | 1.87 | 0.26 | 0.072 | 0.026 | Rest. |

TABLE 2

| Sample No. | Additive of the invention (percent) | Inoculant charge (percent) | Type of graphite in the cast iron (percent) | Composition (percent) |
|---|---|---|---|---|
| OZ-201 | 3 | None | Spheroidal graphite, 100 | Ferrite, 70. |
| OZ-202 | 2 | Fe-Si, 0.5 | do | Ferrite, 60. |
| OZ-203 | 1.5 | Fe-Si, 0.5 | Spheroidal graphite, 80 | Do. |
| OZ-204 | 1 | Fe-Si, 0.5 | Spheroidal graphite, 70 | Ferrite, 70. |
| OZ-205 | 0.5 | Fe-Si, 0.5 | Graphite flake | Ferrite, 90. |

Example 2

A solution was prepared by dissolving 7.5 kg. of hydrous calcium chloride in 3 l. of water by heating. Then, 1 kg. of ammonium chloride, 7.5 kg. of fluorides of rare earth elements, 5 kg. of magnesium fluoride, and 1 kg. of barium carbonate were added to said solution and stirred to mix thoroughly. After the solution was poured on a drying pan made of iron, 35 kg. of pulverized calcium-silicon of under 3 mm. diameter were added, then the drying pan was heated and dried by applying a flame directly thereto in order dehydrate gradually the calcium chloride and make adhere tightly the calcium chloride with chloride of rare earth elements, magnesium fluoride and barium carbonate onto the outer surface of each calcium-silicon particle therein.

When the contents was heated to 560 C., white smoke of ammonium chloride rose therefrom. The drying and dehydrating treatment was carried out continuously until said white smoke was ceased, and then the pan with the contents in it was cooled in a sealed vessel and after cooled replaced the contents in a sealed container such as a polyethylene bag, and stored to use as the additive of the invention.

On the other hand, 1 kg. of Kamaishi ductile pig iron C having a composition as shown in Table 1 was melted in a graphite crucible by using a Kryptol electric furnace, and then the above described additive of the invention was added to the surface of the molten bath. The molten bath was inoculated in the case of some test pieces by adding 0.5% of ferro-silicon as an inoculant, but not inoculated in the case of other test pieces. The molten bath was then molded into a plurality of test pieces consisting of rods of 20 mm. diameter by using green sand molds to carry out microscopic analysis on a fracture of each said test piece. The results are shown in Table 3.

TABLE 3

| Sample No. | Additive of the invention (percent) | Inoculant charge (percent) | Type of graphite in the cast iron (percent) | Composition (percent) |
|---|---|---|---|---|
| OZ-256 | 3 | None | Spheroidal graphite, 100 | Ferrite, 60. |
| OZ-257 | 2 | Fe-Si, 0.5 | do | Ferrite, 70. |
| OZ-258 | 1.0 | Fe-Si, 0.5 | Spheroidal graphite, 80 | Do. |
| OZ-259 | 0.5 | Fe-Si, 0.5 | Spheroidal graphite, 40 | Ferrite, 80. |

The aforementioned test pieces of 20 mm. diameter were then shaped into tensile test pieces of 14 mm. diameter to carry out tensile tests. The tensile strength of test pieces containing not less than 80% of spheroidal graphite was 45 to 60 kg./mm.$^2$ and the corresponding elongation proved to be 3 to 12%.

It has been proved in the above examples that the additives of the invention consisting mostly of calcium-silicon particles coated with calcium chloride or with a mixture of calcium chloride and one or more of chlorides of rare earth elements, said coating being provided with auxiliary agents such as magnesium chloride, barium chloride, magnesium fluoride, barium carbonate, etc., dispersed uniformly in said coating, is effective to produce spheroidal graphite in cast iron. Besides it has been proved that such an additive is ready to make chemical reactions upon adding it into a molten bath to prevent with the aid of said calcium chloride the bondage of the calcium in said additive with oxygen and carbon so that wasteful consumption of the additive may be prevented, that calcium chloride in the additive reduces the melting points of other metal oxide and others and improves the fluidity thereof in order to remove completely impurities in the cast iron from the molten bath, thereby the content of the dross in the cast iron can be considerably reduced.

It has been also proved that such water insoluble auxiliary agents also as fluorides and/or carbonates of rare earth elements and/or magnesium fluoride, and/or barium carbonate, etc., are dispersed and suspended uniformly in the solution of calcium chloride and tightly adhere to the outer surface of each calcium-silicon particle when dehydrated by heating and also contact and react with calcium when mixed with a molten bath of cast iron, thereby the desired cast iron can be produced at a high yield even when only small quantity of the additive of the invention is applied thereto.

Since the additives of the invention are hygroscopic, immediately after dehydration drying it is preferable to store them in moisture-proof containers such as polyethylene bags, or to store them by applying a small quantity of non-drying oil on the surface of the additives.

What I claim is:
1. An additive for production of cast iron containing spheroidal graphite, consisting of 20 to 90% by weight of calcium-silicon as a main component, 2 to 60% by weight of at least one sub-component selected from the group consisting of calcium chloride and a mixture of calcium chloride and at least one of chlorides of rare earth elements, and 2 to 40% by weight of at least one auxiliary compound selected from the group consisting of magnesium chloride, barium chloride, oxides of rare earth elements, fluorides of rare earth elements, carbonates of rare earth elements, magnesium fluoride and barium carbonate.

2. An additive according to claim 1, wherein said calcium-silicon comprises a plurality of small particles, each said particle is coated with a layer of said sub-component and auxiliary compound, said layer being prepared by applying a highly viscous and condensed solution of said sub-component mixed with at least one of said auxiliary compound and then by dehydrating and drying thus applied solution.

References Cited

UNITED STATES PATENTS 2,821,473   1/1958   Moore _____ 75—130
3,309,197   3/1967   Kusaka _____ 75—130

L. DEWAYNE RUTLEDGE, *Primary Examiner.*

THOMAS D. PENDER, *Assistant Examiner.*

U.S. Cl. X.R.

75—58